US009146175B2

(12) United States Patent
Saarinen et al.

(10) Patent No.: US 9,146,175 B2
(45) Date of Patent: Sep. 29, 2015

(54) METHOD AND A DEVICE FOR DETECTING ABNORMAL CHANGES IN PLAY IN A TRANSMISSION UNIT OF A MOVABLE MECHANICAL UNIT

(75) Inventors: Kari Saarinen, Västerås (SE); Shiva Sander-Tavallaey, Saltsjöbaden (SE)

(73) Assignee: ABB Research Ltd, Zürich (CH)

( * ) Notice: Subject to any disclaimer, the term of this patent is extended or adjusted under 35 U.S.C. 154(b) by 1007 days.

(21) Appl. No.: 13/126,767

(22) PCT Filed: Oct. 30, 2008

(86) PCT No.: PCT/EP2008/064715
§ 371 (c)(1),
(2), (4) Date: Jun. 7, 2011

(87) PCT Pub. No.: WO2010/048996
PCT Pub. Date: May 6, 2010

(65) Prior Publication Data
US 2011/0238329 A1    Sep. 29, 2011

(51) Int. Cl.
G01L 3/00       (2006.01)
G01M 13/02   (2006.01)

(52) U.S. Cl.
CPC .................... G01M 13/021 (2013.01)

(58) Field of Classification Search
CPC .................................................. G01M 13/021
USPC .................. 702/33, 34, 44, 87, 188; 318/434;
73/587; 700/245, 264, 284; 714/25
See application file for complete search history.

(56) References Cited

U.S. PATENT DOCUMENTS 8,800,387 B2 *   8/2014  Pernestal ................... 73/862.21
2008/0027663 A1  1/2008  Anderson et al.

FOREIGN PATENT DOCUMENTS

EP     1882922 A        1/2008
WO    WO2007000449 A   1/2007
WO    WO2010/048996    5/2010

OTHER PUBLICATIONS

Hagglund, WO2008/040728 A1, Apr. 2008.*
Gnadt et al., WO 95/33192, Dec. 1995.*

* cited by examiner

Primary Examiner — Sujoy Kundu
Assistant Examiner — Ricky Ngon
(74) Attorney, Agent, or Firm — Seppo Laine Oy

(57) ABSTRACT

The present invention relates to a method and a device for detecting abnormal changes in play in a transmission unit configured to transfer rotational movements of a motor, having a speed of rotation that depends on a torque reference signal ($T_{ref}$), to a movable mechanical unit. The device (20) comprises a first storage (27) for storing torque reference signal values for the motor at least in a time interval during which the motor is running at a steady state rotation speed, a computing unit (22) configured to retrieve measured rotation speed values ($\omega_{measured}$) of the motor during said time interval, to identify the steady state rotation speed of the retrieved rotation speed values, to calculate a frequency spectrum of the torque reference signal, to calculate the energy generated around the second harmonic of the identified steady state rotation speed in a selected frequency band of the calculated frequency spectrum, to compare the calculated energy with at least one limit value, and based thereon, to detect abnormal changes in the play, and a second storage (28) unit for storing the energy calculated at a plurality of different points in time.

13 Claims, 3 Drawing Sheets

METHOD AND A DEVICE FOR DETECTING ABNORMAL CHANGES IN PLAY IN A TRANSMISSION UNIT OF A MOVABLE MECHANICAL UNIT

FIELD OF THE INVENTION

The present invention relates to a method and a device for detecting abnormal changes in play in a transmission unit of a movable mechanical unit comprising a motor connected to the transmission unit and having a rotation speed dependent on a torque reference signal. The invention is useful for detecting abnormal changes in play in transmission units of different types of mechanical units driven by motors of a variable speed, such as robots, NCC-machines, petitioners, and conveyers. The invention can also be used for detecting play in a motor having a constant rotation speed, such as in drive chains in process industry, for example roll-mills, pulp and paper industry.

PRIOR ART

The movements of a programmable mechanical unit are controlled by a control program. Typically, a programmable movable mechanical unit comprises one or more motors, each motor connected to a transmission unit, and a control unit generating torque reference signals for the motors based on the control program and measured values of the rotation speed of the motor. Accordingly, the rotation speeds of the motors are varied in dependence on the generating torque reference signals. The amount of the speed as well as the direction can be varied. The transmission unit is connected to the motor shaft and transfers rotation movements of the motor shaft to the mechanical unit. The transmission unit includes a gear and a gear shaft.

One of the most important components for such a movable mechanical unit is the transmission unit. Faults in the transmission unit are diverse. Depending on the situation, they can affect the performance of the movable mechanical unit considerably. Play, or also called backlash, is clearance between mating components, such as between mated gear teeth. For example, play occurs when two mechanical parts in the transmission unit are not in physical contact with each other, and thus cause the mechanical unit not following the driving motor. The lost motion may occur when a motor is run in forward and reverse directions. The play is a common source of uncertainty found in such a geared movable mechanical unit. At low power outputs, play results in inaccurate calculation from the small errors introduced at each change of direction; while at large power outputs backlash sends shocks through the whole system and can damage teeth and other components.

Although some play is essential for gear transmission, less than the appropriate amount results in interference between the teeth, and on the other hand, excess play introduces looseness into the system. In either case, the result is poor performance and possible damage to the system. This effect is most conspicuous when the system is subjected to non-continuous motion with frequent reversal of the direction of rotation, for example in an industrial robotic application, in which the uncertainty caused by play will also decrease the repeatability and accuracy of the geared servomechanism and hence decrease the performance of the robotic manipulator.

Play may be measured by a conventional measurement tool. The disadvantage with measuring play is the cost for extra installation and configuration of the tool. Furthermore, the entire production line, in which the movable mechanical unit is used, has to be stopped so that the tool can be used for measuring the play, which is not cost-effective.

In the patent application EP1 882 922 a method and an apparatus are presented to diagnose abnormality of reduction gear. The method includes receiving velocity feedback values from the motor and torque instruction values from the control unit, identifying a time period of constant velocity of the motor, calculating the rotation speed of the motor based on the velocity feedback values during that time period, performing a frequency analysis, in the form of a Fourier analysis, on the torque instruction values, and determining the amplitudes of the spectral components corresponding to integer multiples of the rotation speed of the motor. The amplitudes of the spectral components are compared with the amplitudes of reference spectral components, and when one of the amplitudes of the spectral components exceeds the amplitudes of reference spectral component, the gear is regarded as an abnormality and an alarm is outputted. An abnormality may occur due to different reasons. For example an abnormality can be caused by wear, degradation of a bearing, a gear or the like. Although this method can detect an abnormality, it cannot distinguish the cause of the abnormality. In particular it cannot specifically detect an abnormality caused by play in the transmission unit. Further, the amplitude of the reference spectral components can be affected by other disturbances in the transmission unit and the motor. The disadvantage with this method is that it cannot distinguish whether the abnormality is in the motor or in the transmission unit.

There is a desire to be able to specifically detect abnormal changes due to play in a transmission unit in an accurate and efficient way since the transmission unit is an important component in the movable unit and play is one of the most common abnormalities in the transmission unit.

OBJECTS AND SUMMARY OF THE INVENTION

The object of the present invention is to provide a method and a device for detecting abnormal changes in play in a transmission unit of a movable mechanical unit.

This object is achieved by a method as defined in claim 1.

Such a method comprises:
saving torque reference values for the motor at least in a time interval during which the motor is running at a steady state rotation speed,
retrieving measured rotation speed values of the motor at least during said time interval,
identifying the steady state rotation speed of the motor based on the retrieved rotation speed values,
calculating a power spectrum of the torque reference signal,
calculating the energy generated around the second harmonic of the identified steady state rotation speed in a selected frequency band around a peak value of the second harmonic in the calculated power spectrum,
comparing the calculated energy with at least one limit value, and based thereon detecting abnormal changes in the play.

With steady state rotation speed is meant the rotation speed of the motor during a period of time when the motor is running at an essentially constant speed. For example, a typical movement pattern for an industrial robot includes parts of acceleration, deceleration and constant speed. The time interval, during which torque reference values for the motor is saved, must include at least a short part of constant speed of the motor.

For a given signal, the power spectrum gives a plot of the portion of a signal's power falling within given frequency bins. The most common way of generating a power spectrum is by using a discrete Fourier transform, but other techniques such as the maximum entropy method can also be used. For an identified steady state rotation speed, there exists several harmonics of the speed in the power spectrum.

The inventor has surprisingly discovered that the energy generated around second harmonic of the steady state rotation speed of the motor in the power spectrum is dependent on the amount of play in the transmission unit. This means that when play is increased in the transmission unit, the energy generated around the second harmonic frequency band of the rotation speed is dependently increased, and when the play is decreased in the transmission unit, the energy generated around the second harmonic of the steady state rotation speed is dependently decreased. The play may increase due to increased clearance between the teeth of the gear, and the play may decrease due to increased friction in the transmission unit.

Due to the fact that the energy generated around the second harmonic of the identified steady state rotation speed is calculated and then compared with a limit value, the invention makes it possible to detect abnormal changes in the play in the transmission unit of the movable mechanical unit. The limit value or values can be predetermined fixed values, or calculated based on historical values of the energy generated around second harmonic of the rotation speed of the motor.

According to the invention, the energy generated around the second harmonic of the rotation speed is calculated in a frequency band selected around the peak value of the second harmonic in the calculated power spectrum. The peak value is the maximum value of the amplitude of the second harmonics. Thus, the energy generated around the second harmonic of the rotation speed is used for detecting abnormal changes in play in the transmission unit, instead of using the amplitude of the spectral components, as in the prior art. This overcomes the disadvantage that the amplitude of the reference spectral components can be affected by other disturbances in the transmission unit and the motor. Further, in applications where the motor is be running at a varied rotation speed, the varied rotation speed may result in an absence of a sufficient length of the steady state rotation speed of the calculated power spectrum of the torque reference signal. Because of the variation of the rotation speed of the motor, the peak value of the calculated energy generated around the second harmonic of the identified steady state rotation speed in a selected frequency band of the calculated power spectrum may deviate, which means that using only the peak value of the amplitude may result in exclusion of some abnormal changes in play in the gear when the peak value deviates from time to time. The frequency band is selected so that it includes the peak of the second harmonic as well as frequencies on both sides of the peak. By integrating the calculated power spectrum of the torque reference signal within the selected frequency band, a high accuracy in detecting abnormal changes in play in a transmission unit is achieved, which increases reliability and availability of the movable unit. This makes it possible for a user to replace the gear in time.

The calculation of the energy generated is, for example, done by integrating the power spectrum of the torque reference signal within the selected frequency band. The frequency band can be predefined, or selected and varied by the user. Preferably, the interval of the frequency band is about 2-4 Hz around the peak value of the second harmonic in the power spectrum, depending on the signal quality. Too small interval may result in a missed detection of abnormal changes in play; while too big interval may result in a false detection.

According to an embodiment of the invention, the calculated energy is stored as a history datum and the steps for calculating the energy generated around second harmonic of the rotation speed of the motor are repeated at a plurality of different points in time until a plurality of history data is stored. Based on said stored history data, the limit value, or limit values are calculated. It is advantageous that such a limit value is calculated from the history data in the case that data population is unknown and therefore it is impossible to know what the limit values could be. For example in robot applications, there are many types of robots coupled with different categories of motors and gears. The object of the invention is to detect the abnormal changes in play, and not to determine absolute values of the play. The limit value is different for different transmission units. In order to determine the changes in play of a specific transmission unit, the limit value for the transmission unit is determined based on the historic data.

According to another embodiment of the invention, the calculated energy is compared with an upper limit value and a lower limit value. Abnormal changes in play may be due to increased clearance between mating components or increased friction between the mating components. The upper limit value allows detecting looseness in the gear while the lower limit value allows detecting the friction between the mating components; both changes may decrease the performance of the movable mechanical unit. Both an upper limit value and a lower limit value can be calculated based on the history data.

This object is also achieved by a device as defined in claim 8.

Such a device comprises a first storage for storing the torque reference signal value for the motor at least in a time interval during which the motor is running at a steady state rotation speed and a computing unit configured to retrieve measured rotation speed values of the motor during said time interval, to identify the steady state rotation speed of the retrieved rotation speed values, to calculate a power spectrum of the torque reference signal, to calculate the energy generated around the second harmonic of the identified steady state rotation speed in a selected frequency band around a peak value of the second harmonic in the calculated power spectrum, to compare the calculated energy with at least one limit value, and based thereon, to detect abnormal changes in the play.

According to an embodiment of the invention, the device further comprises a second storage for storing the energy calculated at a plurality of different points in time until a plurality of history data is stored.

According to an embodiment of the invention, the computing unit is further configured to calculate the limit value based on the history data stored in the second storage.

According to another embodiment of the invention, device further comprises an interface unit to enable a user to select the frequency band of the calculated power spectrum. It is an advantage of asking the user to select the frequency band so that an appropriated interval can be selected eventually.

According to an embodiment of the invention, the present method is implemented by a computer program product defined in claims 12 and 13.

Such a computer program product comprises saving the torque reference signal values for the motor at least in a time interval during which the motor is running at a steady state rotation speed, retrieving measured rotation speed values ($\omega_{measured}$) of the motor during said time interval, identifying the steady state rotation speed of the retrieved rotation speed values, calculating a power spectrum of the torque reference signal, calculating the energy generated around the second harmonic of the identified steady state rotation speed in a selected frequency band around a peak value of the second harmonic in the calculated power spectrum, storing the calculated energy as a history datum, repeating the above mentioned steps until a plurality of history data is stored, calculating said limit value based on said stored history data, comparing the calculated energy with at least one limit value and based thereon detecting abnormal changes in the play.

Such a computer program can be loaded from a readable medium into the memory of a computing processor, for example, to perform the above-mentioned steps to detect abnormal play in a transmission unit.

The invention is particularly suitable for detecting play in a motor having a variable speed of rotation, and the speed of the motor is varied in dependence on a torque reference signal. However, the invention can also be useful for detecting play in a motor of a constant speed.

BRIEF DESCRIPTION OF THE DRAWINGS

The invention will now be explained more closely by the description of different embodiments of the invention and with reference to the appended figures.

DETAILED DESCRIPTION OF PREFERRED EMBODIMENTS OF THE INVENTION

In the following a device for detecting play in an industrial robot will be described in detail. However, the invention is not limited to detecting play in industrial robots. The invention can be used detecting play in many different types of movable mechanical units.

Figure 1:
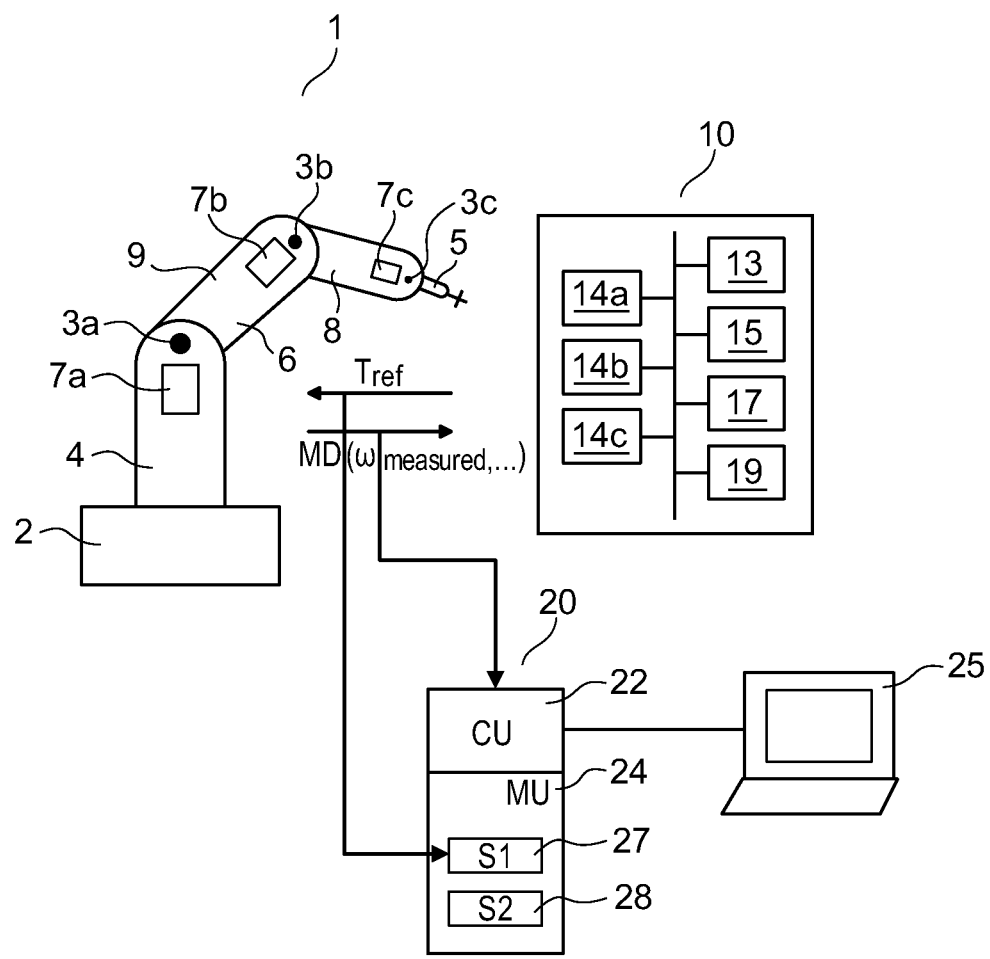
FIG. 1 shows a block diagram illustrating a device for detecting abnormal changes in play in a transmission unit for an industrial robot according to an embodiment of the invention.

FIG. 1 shows a block diagram illustrating a device 20 for detecting play in a transmission unit of an industrial robot 1 according to an embodiment of the invention. The industrial robot 1 comprises a manipulator 9 and a control system 10 controlling the movements of the manipulator. The manipulator 9 comprises a base 2, three arms 4, 6, 8, and a tool holder 5. The arms 6, 8, and the tool holder 5 are rotatable about a plurality of joints 3a, 3b or 3c. The industrial robot also comprises a plurality of actuators 7a-c for controlling the movements of the manipulator. Each actuator 7a comprises a motor (not shown) including a motor shaft and a transmission unit (not shown) configured to transfer rotational movements of the motor shaft to the joints. Each transmission unit comprises a gear and a gear shaft.

The control system 10 comprises a logic unit 13 for executing robot program, a memory unit 15 for storing control program including movement instructions for the robot, a program executor 17 for performing the movement instructions, a path planner 19 for planning the robot movement paths and driving units 14a, 14b and 14c. Each driving unit 14a, 14b, or 14c comprises a servo system for performing a position and velocity loop control based on the motor feedback data. All the units in the control system are interconnected via a wired connection, and the control system is also connected to the robot 1 with a wired or wireless connection. The control system 10 is configured to generate a torque reference signal ($T_{ref}$) for the motors of the manipulator based on the planned robot movement path and motor feedback data MD. The motor feedback data MD includes the rotation speeds of the motors. The torque reference signal ($T_{ref}$) is sent to dive units (not shown) of the robot, which drive units generate variable currents to the motors based on the torque reference signals.

During operation of the robot, the path planner 19 generates joint reference values based on movement instructions and a mathematical model of the robot. Joint reference values are sent to the driving units 14a, 14b and 14c which in turn, in the velocity loop control, generate torque reference values in response to the joint reference values and based on feedback data MD, including a measured rotation speed $\omega_{measured}$.

Preferably, the device 20 for detecting abnormal changes in play according to the invention is a part of the control system 10 of the robot. In such a case, the device 20 utilizes processing power and data storage of the robot control system. Alternatively, the device 20 for detecting abnormal changes in play according to the invention can be implemented on an external computer in communication with the robot control system, for example, via a network. The robot may include one device 20 for detecting changes in play for each of the joints 3a-c.

The device 20 for detecting abnormal changes in play in a transmission unit comprises a computing unit 22, a memory unit 24 including a first storage unit 27 and a second storage unit 28, and an interface unit 25. The interface unit 25 is, for example, a portable Tech Pendant Unit of the robot. The first storage unit is used to store the torque reference values ($T_{ref}$) which are generated by the driving units 14a, 14b and 14c. The computing unit 22 comprises means for calculating a frequency spectrum of the torque reference signal, for calculating the energy generated around the second harmonic of an identified steady state rotation speed in a selected frequency band of the calculated frequency spectrum, for comparing the calculated energy with an upper limit value and a lower limit value, and based thereon for detecting abnormal changes in the play. The computing means can be implemented as a software module. The computing unit further comprises hardware for running the software module. The hardware of the computing unit can be, for example, a micro-computing processor, a digital signal processor, a field-programmable gate array, or a standard computer. The second storage unit 28 is configured for storing the energy calculated at a plurality of different points in time until a plurality of history data is stored so the upper limit value and the lower limit value can be calculated in a post processing. Both storages 27 and 28 may be allocated in the memory unit 24, for example, in form of RAM or ROM.

The interface unit 25 is configured for enabling a use to select a proper frequency band. It can be also configured to indicate the result from the computing unit. For example, when the calculated energy exceeds the upper limit value or below the lower limit value, an indicator may be set to yellow and an alarm may be presented in the interface unit to indicate that abnormal changes in the play is found. If the computing unit has too few history data to calculate the upper limit value and the lower limit value, a black indicator may be shown in the interface unit. Otherwise a green indicator is presented on the interface unit to show that the play is in a normal condition. The interface unit can be a monitor with keyboard and mouse; it can also be a handhold unit. The location of the device 20 may not be the same place as the control system 10, the communication between the device 20 and the control system 10 can be either wired with a direct connection or through internet connection to a remote service system.

Figure 2:
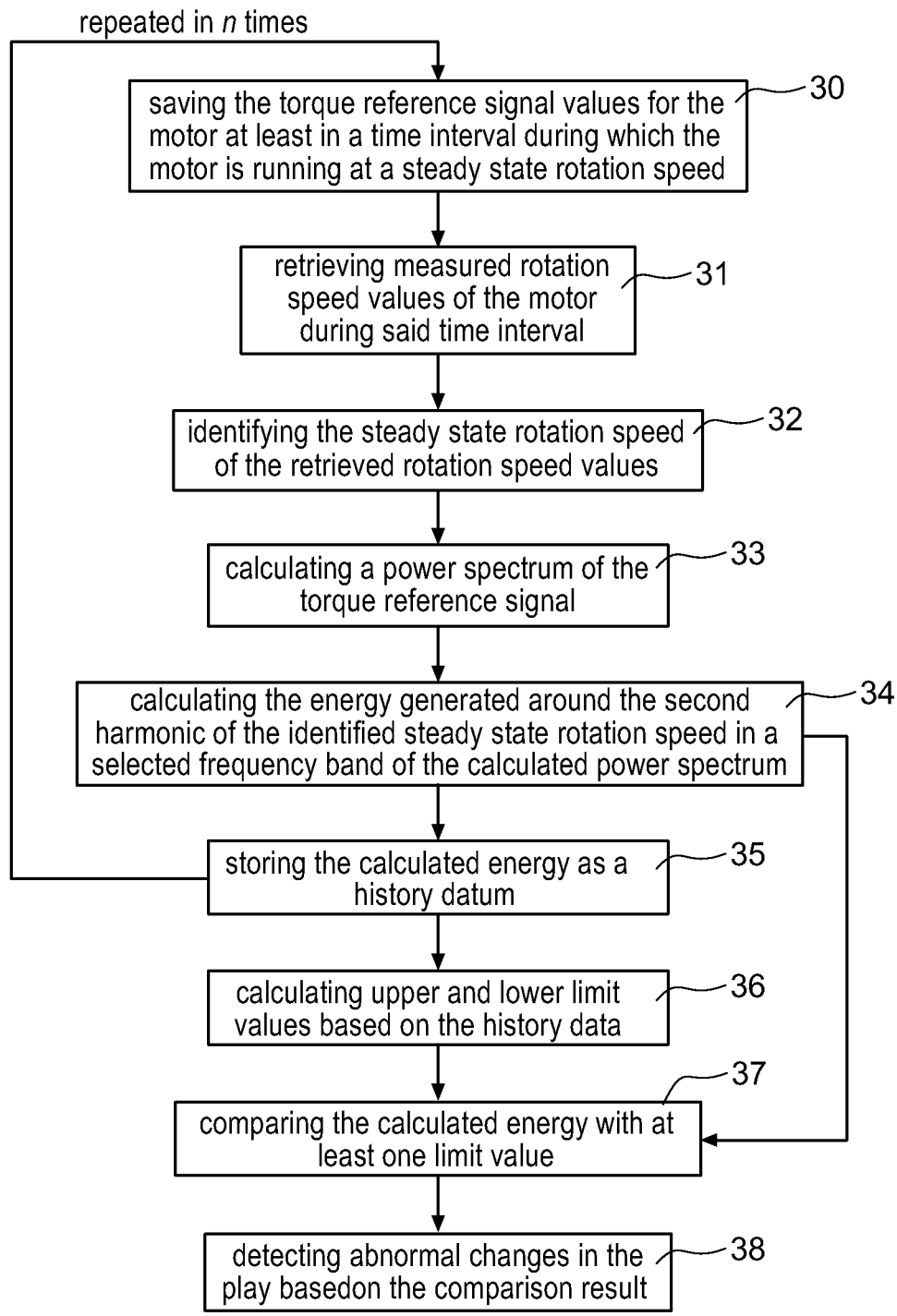
FIG. 2 shows a flow chart illustrating a method for detecting abnormal changes in play in a transmission unit according to an embodiment of the invention.

FIG. 2 shows a flow chart illustrating a method for detecting play in a gear for a movable mechanical unit. It will be understood that each block of the flow chart can be implemented by computer program instructions. The method comprises the following steps:

The torque reference signal values ($T_{ref}$) during a time interval in which the motor, at least for a short time, is running at a steady state rotation speed are saved in the first storage 27, block 30. To enable the motor to run at a steady state rotation speed, a dedicated test cycle may be used. Such a test cycle may run regularly on the movable mechanical unit in 4 to 8 seconds each time. Alternatively a production cycle may be used if the motor can be kept running at a steady state rotation speed in a time interval, for example, in a few seconds.

While the motor is running at the steady state rotation speed, measured rotation speed values of the motor are retrieved, block 31. The steady state rotation speed of the motor is identified based on the retrieved rotation speed values, block 32.

A power spectrum, of the torque reference signal is calculated based on the saved torque reference signal values, block 33. How to calculate a power spectrum of a signal is well known in the prior art. The power spectrum is calculated, for example, by using a discrete Fourier transform on the saved torque reference signal values. However other techniques, such as the maximum entropy method, can also be used.

Further, the second harmonic of the identified steady state rotation speed, which is twice of the rotation frequency, is detected in the power spectrum. Thereafter, the energy generated around the second harmonic of the identified steady state rotation speed is calculated, block 34. In this embodiment, the calculation of the energy is done by integrating the calculated power spectrum of the torque reference signal within a selected frequency band, surrounding the second harmonic. The interval of the selected frequency band is about 2-4 Hz around the peak value of the second harmonic in the frequency spectrum, depending on the signal quality. Too small interval may result in a missed detection of abnormal changes in play; while too big interval may result in a false detection.

The calculated energy is compared with one or more limit values, block 37. According to one embodiment of the invention, there is only one limit value, the calculated energy is compared with the limit value, and abnormal changes in the play is detected if the calculated energy value exceeds the limit value, block 38. In this embodiment it is detected whether the clearance between two components in the transmission unit has become too large.

According to another embodiment of the invention, there are an upper and a lower limit value, and the calculated energy is compared with the upper and lower limit values, and abnormal changes in the play is detected if the calculated energy value exceeds the upper limit value, or if the calculated energy value is below than the lower limit value, block 38. In this embodiment it is detected whether the clearance between two components in the transmission unit has become too large and if the friction in the transmission unit has become too high.

Alternatively, the calculated energy is stored as a history datum in the second storage 28, block 35, and steps 30-35 are performed a number of times at different points in time. The accumulated history data can be used, block 36, for example, in an off-line post processing to further calculate an upper limit value and a lower limit value. To calculate the upper and lower limit values and detect the abnormal changes in the play, some well-known decision-making tool such as classical statistical process control, denoted as SPC, or cumulative-sum CUSUM or exponentially weighted-moving-average EWMA may be used.

Figure 3:
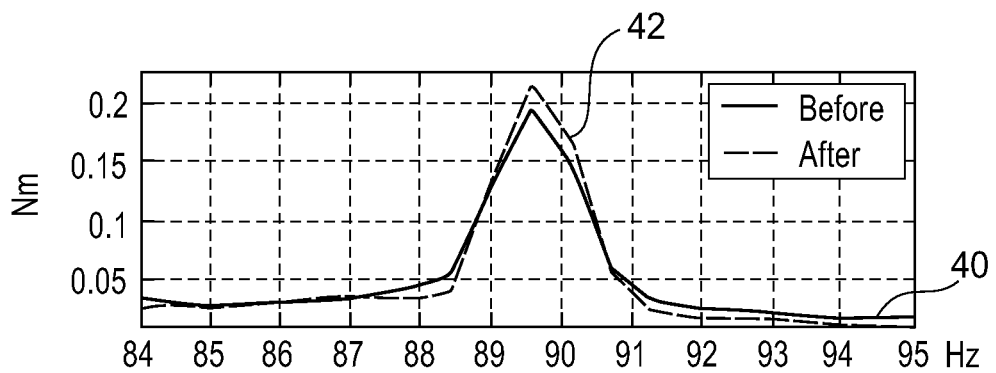
FIG. 3 shows the power spectrum of the torque reference signal zoomed around the second harmonic of the identified steady state rotation speed before and after play is introduced.

FIG. 3 shows an example of a power spectrum of a torque reference signal zoomed around the second harmonic of an identified steady state rotation speed before 40 and after 42 play is introduced. As seen from the figure, the amplitude as well as the energy around the second harmonic is increased in the case when play is present. The second harmonic of the rotation speed in this example is about 89.5 Hz, which means the steady state rotation speed of the motor is about 45 Hz in accordance with a torque reference signal as 281.7 rps, radian per second. The frequency band around the second harmonic is for example, selected as 88.5-90.5 Hz, which means that the length of the interval is about 2 Hz. The unit for y-axis is Nm, Newton-meter and the unit for x-axis is Hz.

Figure 4:
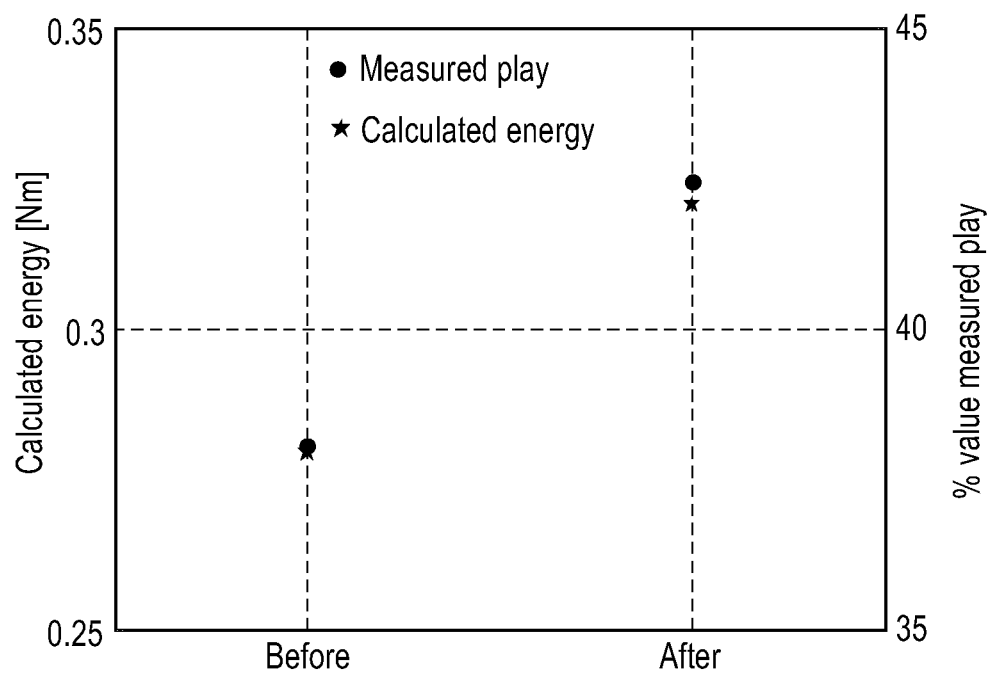
FIG. 4 shows a comparison between the present invention and a play measurement tool.

FIG. 4 shows a comparison between the present invention and a conventional tool for measuring the play in a transmission unit. Accordingly, the measured play can be assumed to be the true play. The left y-axis is the energy calculated according to the invention, which is in unit of Nm, Newton-meter for indicating the changes of the calculated energy in the play; while the right y-axis is the measured changes in play in percentage. The figure shows that the invention provides a rather accurate value, about 15%, for indication of the change in amount of the play in the transmission unit, in comparison with the play measurement tool, which provides 12% increase of the play for the same case presented in the FIG. 3a, which means that the result obtained from the invented method is very close to the play measurement tool, and has a considerable accuracy.

The invention claimed is:

1. A method for detecting abnormal changes in play in a transmission unit configured to transfer rotational movements of a motor, having a speed of rotation that depends on a torque reference signal, to a movable mechanical unit, wherein the method comprises, in a device for detecting abnormal changes in play in the transmission unit, computer implemented steps of:
   a. saving torque reference values for the motor at least in a time interval during which the motor is running at a steady state rotation speed,
   b. retrieving measured rotation speed values of the motor at least during said time interval,
   c. identifying the steady state rotation speed of the motor based on the retrieved rotation speed values,
   d. calculating a power spectrum of the torque reference signal,
   e. calculating an energy generated around a second harmonic in a selected frequency band surrounding the identified steady state rotation speed, wherein the selected frequency band is around a peak value of the second harmonic in the calculated power spectrum,
      comparing the calculated energy with at least one limit value, and
      based thereon detecting abnormal changes in the play in the transmission unit.

2. The method according to claim 1, wherein said calculated energy is stored as a history datum and the steps a-e are repeated at a plurality of different points in time until a plurality of history data is stored.

3. The method according to the claim 2, wherein said at least one limit value is calculated based on said stored history data.

4. The method according to claim 1, wherein said calculated energy is compared with an upper limit value and a lower limit value.

5. The method according to claim 4, wherein said upper limit value and said lower limit value are calculated based on said plurality of history data.

6. The method according to claim 1, wherein said calculation of the energy is done by integrating the calculated power spectrum of the torque reference signal within the selected frequency band.

7. The method according to claim 1, wherein said frequency band is selected within an interval of 2-4 Hz.

8. A device for detecting abnormal changes in play in a transmission unit configured to transfer rotational movements of a motor, having a speed of rotation that depends on a torque reference signal, to a movable mechanical unit, wherein the device comprises:
   a first storage medium for storing torque reference signal values for the motor at least in a time interval during which the motor is running at a steady state rotation speed,
   a computing unit configured,
      to retrieve measured rotation speed values of the motor during said time interval,
      to identify the steady state rotation speed of the retrieved rotation speed values,
      to calculate a power spectrum of the torque reference signal,
      to calculate an energy generated around a second harmonic in a selected frequency band surrounding the identified steady state rotation speed, wherein the selected frequency band is around a peak value of the second harmonic in the calculated power spectrum,
      to compare the calculated energy with at least one limit value, and
      based thereon, to detect abnormal changes in the play in the transmission unit.

9. The device according to claim 8, wherein said device further comprises a second storage medium for storing the energy calculated at a plurality of different points in time until a plurality of history data is stored.

10. The device according to claim 9, wherein said computing unit is further configured to calculate said at least one limit value based on said plurality of history data stored in the second storage medium.

11. The device according to claim 8, wherein said device further comprises an interface unit to enable a user to select said frequency band of the calculated power spectrum.

12. A computer program product stored on a non-transitory computer readable medium for detecting abnormal changes in play in a transmission unit configured to transfer rotational movements of a motor, having a speed of rotation that depends on a torque reference signal, to a movable mechanical unit, wherein the computer program product is directly loadable into an internal memory of a computer, comprising software to perform the steps of:
   a. saving torque reference signal values for the motor at least in a time interval during which the motor is running at a steady state rotation speed,
   b. retrieving measured rotation speed values of the motor during said time interval,
   c. identifying the steady state rotation speed of the retrieved rotation speed values,
   d. calculating a frequency spectrum of the torque reference signal,
   e. calculating an energy generated around a second harmonic in a selected frequency band surrounding the identified steady state rotation speed, wherein the selected frequency band is around a peak value of the second harmonic in the calculated frequency spectrum, comparing the calculated energy with at least one limit value, and
   based thereon detecting abnormal changes in the play in the transmission unit.

13. The computer program product according to claim 12, wherein the computer program product comprise software to perform the steps of:
   f. storing said calculated energy as a history datum,
      repeating steps a-f until a plurality of history data is stored, and
      calculating said at least one limit value based on said stored history data.

* * * * *